United States Patent [19]

Leigh

[11] 4,140,103
[45] Feb. 20, 1979

[54] SOLAR ENERGY COLLECTORS

[75] Inventor: John M. Leigh, Kew, Australia

[73] Assignee: The Broken Hill Proprietary Company Limited, Melbourne, Australia

[21] Appl. No.: 813,615

[22] Filed: Jul. 6, 1977

[30] Foreign Application Priority Data

Jul. 7, 1976 [AU] Australia .................. PC 6562

[51] Int. Cl.² ................................................ F24J 3/02
[52] U.S. Cl. ...................................... 126/271; 165/105
[58] Field of Search ................ 126/270, 271; 165/105

[56] References Cited

U.S. PATENT DOCUMENTS

| 3,906,261 | 9/1975 | Ogura et al. | 165/105 |
|---|---|---|---|
| 3,923,038 | 12/1975 | Cutchaw | 126/271 |
| 4,027,653 | 6/1977 | Meckler | 126/271 |
| 4,038,966 | 8/1977 | Harrison | 126/271 |
| 4,062,350 | 12/1977 | Reed | 126/271 |

Primary Examiner—Carroll B. Dority, Jr.
Attorney, Agent, or Firm—Cushman, Darby and Cushman

[57] ABSTRACT

A solar energy collector comprising a closed envelope formed from two sheets of metallic material bonded together around their peripheral edges and spaced apart to define a space adapted to be filled with working fluid and opening into a vapor space formed from an outwardly directed indentation in one of the sheets and into which space working fluid can vaporize when heated by exposing one surface of the envelope to solar radiation. At least one condensing tube is provided in direct thermal contact with the vapor space and through which liquid to be heated flows, while means are provided for returning condensed vapor from the vapor space to the working fluid space. In one form of the invention a lower of the two sheets has a plurality of parallel extending corrugations formed therein the inner extremities of which abut the surface of the upper sheet to space the sheets apart, which corrugations are alternatively of large and small width, the larger corrugations primarily forming a plurality of working fluid spaces and the smaller of the corrugations primarily forming a plurality of condensate return channels, with one condensing tube passing into and through the vapor space. The closed envelope in one form of the invention is supported in a container and is surrounded beneath and at the sides and ends thereof by a layer of insulating material with the upper open face of the container being closed by a sheet of toughened glass.

9 Claims, 18 Drawing Figures

FIG. 18.

SOLAR ENERGY COLLECTORS

This invention relates to improvements in solar energy collectors.

The conventional "flat plate" solar collector basically comprises a series of vertical copper tubes, spaced at intervals with about 150 mm, connected to top and bottom horizontal tubes which provide flow passages for the water being heated. The vertical tubes are usually covered with a thin copper sheet which is surfaced with either black paint or a more efficient selective coating so that the copper sheet acts as the principal solar radiation absorber. The collected energy is conducted from the copper sheet to the water in the copper tubes and the hot water in the collector is usually transferred to the storage tank by thermo-siphon, the hot water rising to the storage tank and forcing the colder water down to the collector to be heated.

Because of the comparatively large mass of water in the collector tubes, heat transfer between the collector and storage is relatively slow; consequently quite substantial amounts of collected energy can be lost during periods of intermittent sunshine. Another major disadvantage of conventional collectors is that because the system is "open", corrosion prevention is the major consideration in material selection. Hence expensive copper tube and sheet is required with most present collector designs. Furthermore, conventional collectors are limited by their design to a maximum water temperature below 100° C. for example, about 80° C.

Generally, the efficiency of a solar system depends on the differential between the operating and ambient temperatures. It will be evident from the above that in places with a higher ambient temperature, the existing commercial solar absorbers have serious limitations. The object of this invention is to provide a solar energy collector that overcomes most of the limitations of conventional collectors and can operate more efficiently.

A solar energy collector comprising a close envelope formed from two sheets of metallic material sealed together around their peripheral edges and spaced apart to define a space adapted to be filled with a working fluid, said space opening into a vapour space into which said working fluid can vapourise when heated by exposing one surface of the envelope, defining said working fluid space, to solar radiation, at least one condensing tube in heat exchange relationship with said vapour space and through which liquid to be heated flows, and means for returning condensed vapour from said vapour space to said working fluid space, wherein at least one of said two sheets has a plurality of parallel extending indentations formed therein, the inner extremeties of the walls defining said indentations abutting the surface of the other sheet to space said sheets apart, wherein said indentations are alternatively of large and small cross-sectional area, said larger indentations forming a plurality of spaces primarily for working fluid and the smaller of said indentations forming a plurality of channels primarily for returning said condensate, and wherein at least one of said sheets has an outwardly directed indentation formed therein to define said vapour space, and at least one of said sheets including an outwardly directed indentation at the opposite end thereof to provide a channel for fluid communication between said condensate return channels and said working fluid spaces.

In one form of the invention the condensing tube extends into, and passes through said vapour space. In another form, several condensing tubes are engaged in grooves formed in the wall of the envelope at said vapour space and are intimately bonded to said envelope so that thermal conduction to the tubes is maximum.

The envelope is preferably formed by two sheets of metals such as stainless steel suitably sealed around their peripheries and spaced to define said working fluid space. The vapour space is preferably defined by an indentation in one or both sheets.

Three preferred forms of the invention will now be described with reference to the accompanying drawings in which.

With reference to FIGS. 1 to 5 of the drawings, the collector of this first embodiment comprises two thin (0.5 to 1 mm) sheets of steel 1 and 2, the top sheet 1 being treated on its outer surface to provide a selective solar energy absorber surface S. For example, the sheet 1 may be treated with CSIRO chrome black or any other suitable treatment.

The bottom sheet 2 is formed with a plurality of upstanding ribs 3 by means of which a suitable working fluid space (about 0.5 mm deep) is formed and maintained between the two sheets 1 and 2 which are seamed together around their peripheries in the same manner as is used in can end seaming to provide an hermetic seal 9. The bottom sheet 2 is also formed with a plurality of interconnected outwardly directed elongated indentations 4 which define with the top sheet 1 a plurality of condensate return channels. The channels include side channels 5 extending down the sides and opening into a bottom channel 6 which is open to the space between the sheets 1 and 2. Across channel 7 extends across the plate 2 between the side channels 5 and a plurality of short feeder channels 8 extend up from the cross channel 7.

The channels 7 and 8 are open to a vapour space 10 formed by an outwardly directed depression in the top sheet 1. The depression is formed with several outwardly directed channels 12 which are adapted to substantially surround condensing tubes 11 of copper or like corrosion resistant material of good heat conductivity. To ensure good heat conduction between the tubes 11 and the portion of the sheet defining the vapour space 10, the tubes 11 are soldered or otherwise intimately bonded to the top sheet 1.

Prior to the final sealing of the collector the space is evacuated to about 25 mm of water through a hole (not shown) and the space is filled with water or any suitable liquid (e.g. to the level of the vapour space 10) and then hermetically sealed. While evacuation is not essentials for the collector to work, the efficiency of operation is improved substantially thereby. It may be necessary to weld the sheets 1 and 2 together about their peripheries, or some suitable sealing compound positioned between the seam between the two sheets to ensure a hermetic seal.

Figures 1, 2:
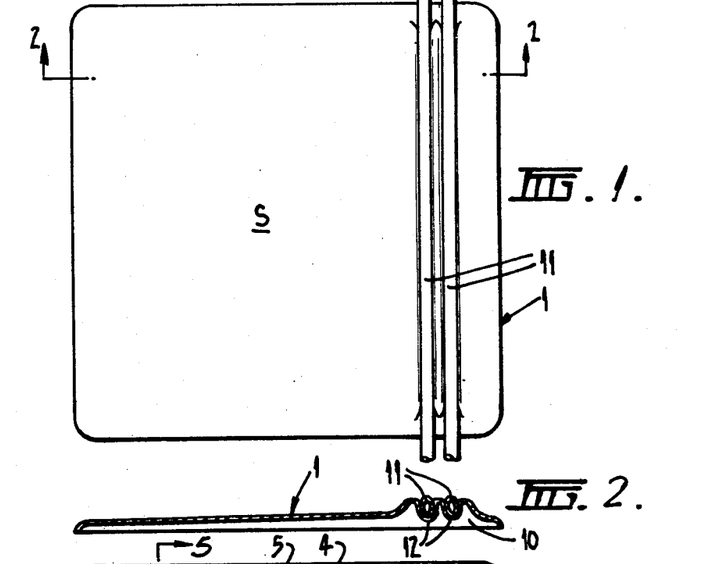
FIG. 1 is a plan view of the upper component of one preferred form of solar energy collector envelope incorporating the present invention.
FIG. 2 is a cross-sectional view taken along line 2—2 of FIG. 1.
Figures 3, 4:
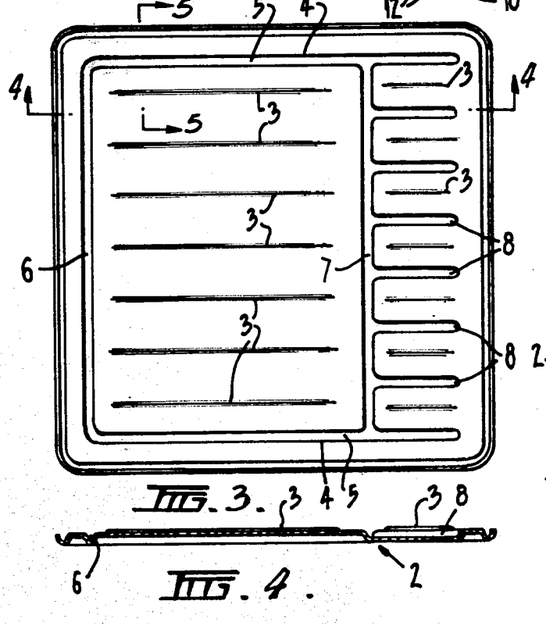
FIG. 3 is a plan view of the lower component of the collector envelope which is adapted to be joined to the component of FIG. 1 to form the complete envelope of the collector.
FIG. 4 is a cross-sectional view taken along line 4—4 of FIG. 3.
Figure 5:
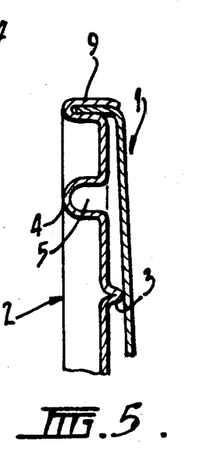
FIG. 5 is a cross-sectional view of part of a complete collector envelope taken along line 5—5 of FIG. 3.
Figures 6, 8:
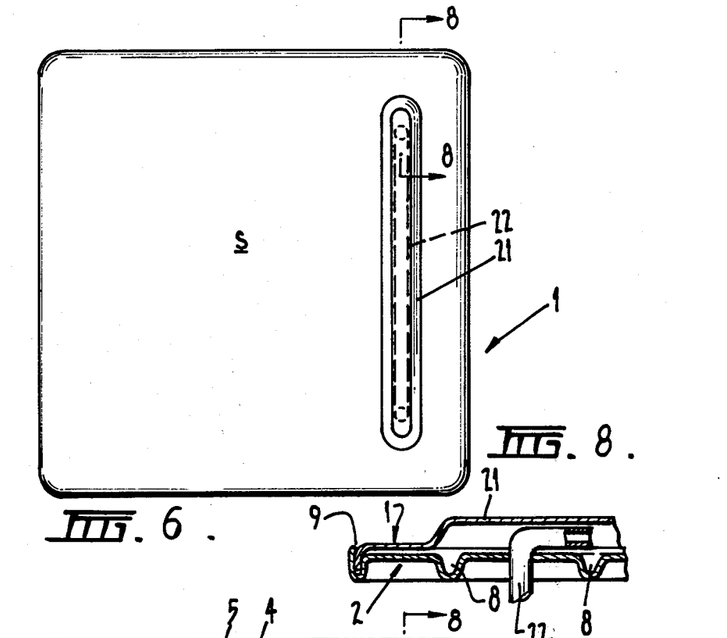
FIG. 6 is a plan view of the upper component of a second preferred form of solar energy collector envelope incorporating the present invention.
FIG. 8 is a cross-sectional view of portion of the complete collector of this embodiment taken along line 8—8 of FIG. 6.
Figure 7:
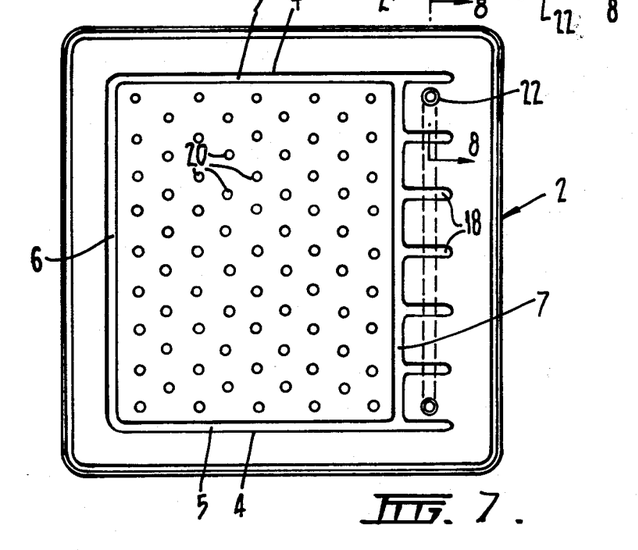
FIG. 7 is a plan view of the lower component of the collector envelope which is adapted to be joined to the component of FIG. 6 to form the complete envelope of the collector.
Figure 9:
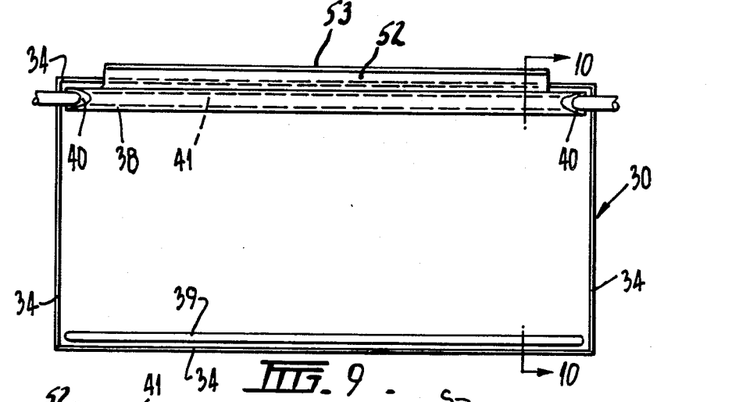
FIG. 9 is a plan view of the upper component of a third preferred form of solar collector envelope incorporating the present invention.
Figure 10:
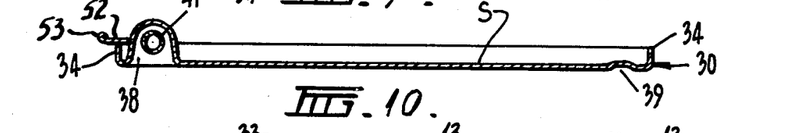
FIG. 10 is a cross-sectional view taken along line 10—10 of FIG. 9.
Figure 11:
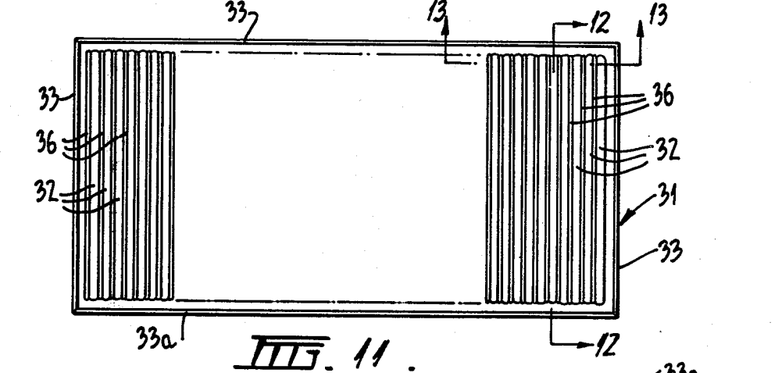
FIG. 11 is a plan view of the lower component of the collector envelope which is adapted to be joined to the component of FIG. 9 to form the complete envelope of the collector.
Figure 12:
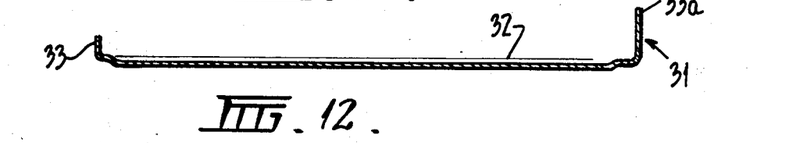
FIG. 12 is a cross-sectional view taken along line 12—12 of FIG. 11.
Figure 13:
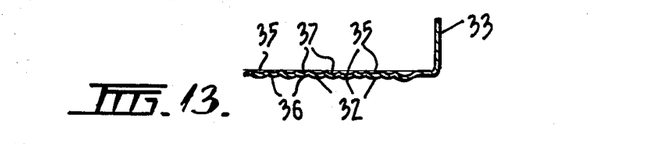
FIG. 13 is a cross-sectional view taken along line 13—13 of FIG. 11.

In use, the condensing tubes 11 are connected to a tank of water and the absorber surface S is exposed to solar radiation and the collector supported at an inclined position. Whenever the surface S is heated above the temperature of water in the tank, the water in the working fluid space boils generating vapour in the vapour space 10 which condenses on the portions of the sheet 1 in contact with the tubes 11 to heat the water therein. The tubes 11 are inclined at about 3° to 4° to the horizontal to ensure positive movement by thermosiphon of the water in the tubes. The vapour condenses on the inside walls of the vapour space 10 and runs down the channels 8 into the channel 7 and thence into channels 5 to channel 6 where it is available for vapourization. This process continues until the liquid in the tank attains the temperature of the absorber surface S. In the second embodiment shown in FIGS. 6, 7 and 8, which embodiment represents a modification of the embodiment of FIGS. 1 to 5 and where applicable the same numerals are used, the ribs 3 are replaced by dimples 20 formed in the bottom sheet 2. Also, the indentation 21 defining the vapour space is flat bottomed and a condensing tube 22 extends through the bottom plate 2 and into the vapour space where it is in direct contact with the vapour and vapour condenses directly on the wall of the tube 22. For this reason this second embodiment is more preferred than the first embodiment. Otherwise the arrangement and operation is identical to the first embodiment.

In the third embodiment, with reference to FIGS. 9 to 13, the collector also comprises two thin sheets of stainless steel 30 and 31, the top sheet 30 being treated on its outer surface to provide a selective solar energy absorber surface S as with the preceding embodiments. The bottom sheet 31 has a plurality of alternatively large and small width parallel corrugations 32 and 36 respectively formed therein, extending side by side across substantially the full width of the sheet 31, with each corrugation extending from a position adjacent a lower edge of the collector, when inclined, to a position adjacent the upper edge of the collector. The bottom sheet has a peripheral flange 33 formed thereon, a portion 33a of which at one end of the sheet is greater in height than the remainder of the peripheral flange. The upper sheet 30 also has a peripheral flange 34 formed thereon, and when the top and bottom sheets 30 and 31 are united they are joined by welding or seaming their peripheral edges 33 and 34 to provide a hermetic seal. The two sheets may be welded together at intervals sufficient to produce a structure capable of withstanding a positive internal pressure in the envelope of 4 to 5 atmospheres. When the two sheets 30 and 31 are joined the inner ridges of the corrugations 32 and 36 in the lower sheet abut the inner surface of the upper sheet 30 to form channels 35 approximately 0.6 mm deep within the larger corrugations 32 primarily forming working fluid spaces and smaller channels 37 within the smaller corrugations 36 primarily acting as condensate return channels.

The channels 35 and 37 are open to a vapour space 38 formed by an outwardly directed depression in the top sheet 30, and are open at their opposite ends to a bottom channel 39 formed by a slightly outwardly directed depression in the top sheet 30. It is believed that vapour will tend to form in the larger channels 35 insofar as they offer the path of least resistance, whilst any fluid accumulating in the vapour space 38, either as condensate or fluid carried by the vapour up the channels 35, will return back down the smaller condensate return channels 37. As shown, the vapour space 38 formed by the outwardly directed depression in the top sheet 30 has sloping end walls 40 through which a condensing tube 41 passes to extend through the vapour space 38. The condensing tube is affixed to the sloping end walls 40 by silver soldering.

As with the previous embodiments, prior to final sealing of the collector envelope, the space is evacuated to about 25 mm of water through a hole (not shown) and the space is filled with water or suitable fluid (e.g. to the level of the vapour space 38) and then hermetically sealed. In use, the condensing tube 41 is connected to a tank of water and the absorber surface S is exposed to solar radiation and the collector supported at an inclined position. As with the previous embodiments, when the surface S is heated above the temperature of water in the tank, the water or fluid in the working fluid channels 35 boils generating vapour in the vapour space 38 which condenses on the outer surface of the condensing tube 41 within the space to heat the water within the tube 41. The tube 41 may be inclined at about 3° to 4° to the horizontal as with the previous embodiments to ensure positive movement by thermo-siphon of the water in the tube. The condensed vapour runs down the condensate return channels 37 into the bottom channel 39 and then into the channels 35 where it is available for vapourization. This process continues until the liquid in the storage tank attains the temperature of the absorber surface S.

Figure 14:
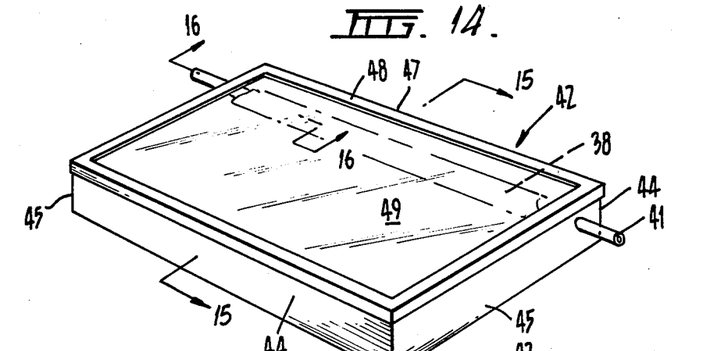
FIG. 14 is a perspective view of one form of complete solar energy collector incorporating a solar energy collecting envelope of the type illustrated with reference to FIGS. 9 to 13.
Figure 15:
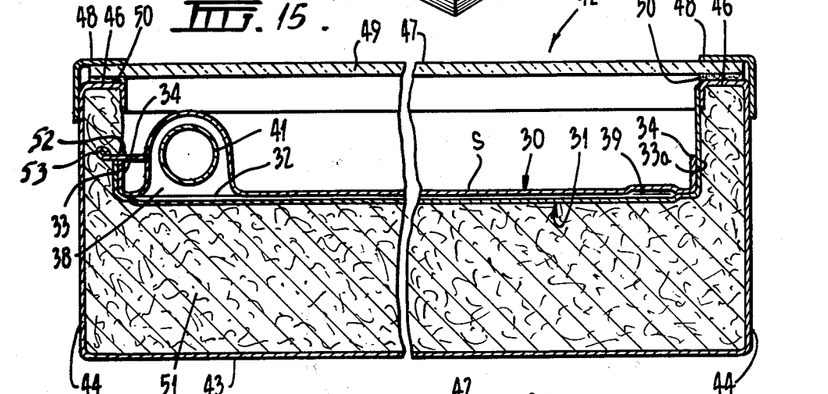
FIG. 15 is a cross-sectional view taken along line 15—15 of FIG. 14.
Figure 16:
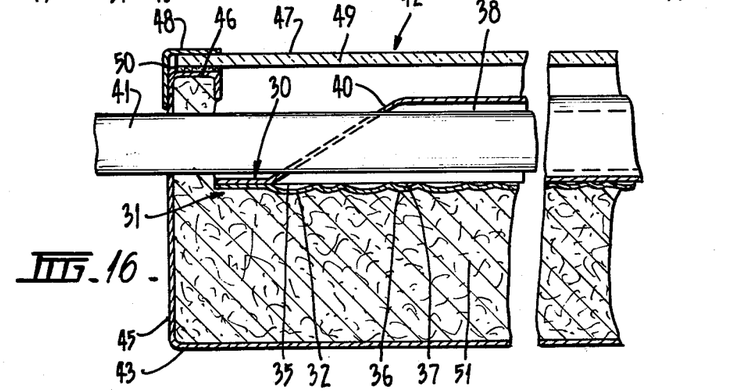
FIG. 16 is a cross-sectional view of part of the collector taken along line 16—16 of FIG. 14.

Referring to FIGS. 14 to 16 of the drawings there is shown a complete solar energy collector, generally indicated as 42, and incorporating the solar energy collecting envelope of the embodiment of FIGS. 9 to 13 which is identified by the same reference numerals.

The complete collector comprises a shallow box shaped container open at the top and formed from sheet zincalume which is cut and folded to form a base wall 43, longitudinal side walls 44, end walls 45, and inturned upper peripheral edges 46. The top of the container is closed by a lid member 47 comprising a peripheral frame 48 of L-shaped section adapted to overlie the edge of the container as shown, and, as shown, a sheet of toughened glass 49 is adapted to be received between the inturned edges 46 of the container and the peripheral frame 48, whilst supporting strips of resilient material 50 are interposed between the glass sheet 49 and the container.

The solar energy collecting envelope is positioned within the container as shown in FIGS. 15 and 16, and is surrounded beneath, and at its sides and ends, by a layer of insulating material 51, such as, fibreglass, whilst in order to retain the collector envelope in position, particularly when the collector is tilted or inclined during use, the upper edge of the higher portion of the peripheral flange 33a bears against the downwardly inturned section of the adjacent upper peripheral edge 46 of the container, whilst one longitudinal edge of a connecting strip 52, with a rolled edge 53, is attached to one side of the portion of the collector envelope which defines the vapour space 38, with the rolled edge 53 being embedded within the adjacent layer of insulating material 51 as shown.

A test has been carried out on a solar energy collector of the type described and illustrated above with reference to FIGS. 9 to 16 of the drawings, and the results of the test compared with the characteristics of a typical conventional collector in order to provide an indication of what degree of improvement a solar energy collector of the present invention would offer over a conventional collector.

For the purposes of the test a simplified form of solar energy collector was fabricated which differed from the collector described above insofar as the collector envelope was manufactured from sheet aluminium, whilst a 12 mm diameter copper condensing tube was utilised. The upper surface of the collector envelope was coated with a matt black paint, and the envelope was supported in a container constructed from timber with a 25 mm thickness of polystyrene insulation backing the envelope and the collector was finally completed with a 3 mm thick toughened glass cover. Furthermore, a thin strip of metal twisted to form a spiral was inserted inside the condensing tube to induce greater turbulence in the fluid (in this case water) passing through the tube. The working fluid within the collector envelope was water.

The output end of the condensing tube of the collector was, via a pump, attached to, and in communication with the interior of, a storage tank filled with water at a position adjacent the top thereof, whilst the opposite end of the condensing tube was attached to, and in communication with the interior of, the storage tank at a position adjacent the bottom thereof.

During the test, temperature readings were taken, and recorded, for the top and bottom of the water storage tank, whilst readings were simultaneously taken and recorded for ambient temperature and the temperature of the collector envelope. The temperatures of the water in the storage tank, and ambient temperature, were measured with glass mercury thermometers, whilst the collector envelope temperatures was measured by thermocouples. The amount of incident solar radiation (insolation) was also simultaneously measured and recorded using a Middleton Pyranometer, which was set and inclined at the same angle of inclination as the test collector and the collector and pyranometer were located on a stand generally facing the northern sky, which at the time of the year in which the test was carried out in Australia, is where the sun is situated.

The test was carried out between 1145 and 1300 hours on the day selected for the test, and comprised 16 separate readings at intervals of about 6 minutes.

From the readings taken the efficiency calculations for the collector were made in accordance with the following formula:

$$\eta = \frac{(M_1 Cp_1 + M_2 Cp_2 + M_3 Cp_3) \Delta t}{A_c G}$$

where:
$\eta$ = efficiency
$M_1$ = mass of water in storage tank
$M_2$ = mass of storage tank
$M_3$ = mass of fittings
$Cp_1$ = specific heater of water
$Cp_2$ = specific heat of storage tank
$Cp_3$ = specific heat of fittings
$A_c$ = area of glass aperture for the collector
$G$ = INSOLATION
$\Delta_t$ = increment of temperature It is important to note that during the test heat losses from the pump, pipes and tanks have not been allowed for in the calculations made. The readings and calculations made are set out in table 1, in which $T_\omega$ is the average temperature in the water storage tank calculated from the temperature measurements made at the top and bottom of the tank, and $T_e$ is the approximate sky temperature which is equivalent to the ambient temperature minus 3° C.

TABLE I

| Ambient Temp °C | Tank Temp °C Top | Tank Temp °C Bottom | Average Tank Temp $T_\omega$ °C | Insolation G W/M² | Time Increment Min | $\frac{T_\omega - T_e}{G}$ | Efficiency $\eta$ | Efficiency Averaged Over Two Periods |
|---|---|---|---|---|---|---|---|---|
| 15 | 26.0 | 25.5 | 25.75 | | | | | |
| 15 | 28.0 | 27.5 | 27.75 | 868 | 6 | 0.018 | 0.71 | |
| 16 | 29.5 | 29.0 | 29.25 | 904 | 6 | 0.018 | 0.51 | 0.61 |
| 15.5 | 30.5 | 30.0 | 30.25 | 901 | 5 | 0.02 | 0.41 | |
| 15.5 | 33.0 | 32.5 | 32.75 | 922 | 6 | 0.022 | 0.83 | 0.62 |
| 15.5 | 34.5 | 33.5 | 34.0 | 912 | 5 | 0.023 | 0.50 | |
| 15.5 | 36.0 | 35.2 | 35.6 | 909 | 6 | 0.025 | 0.54 | 0.52 |
| 16.0 | 37.5 | 36.6 | 37.15 | 933 | 5 | 0.026 | 0.61 | |
| 15.5 | 39.0 | 38.5 | 38.75 | 897 | 5 | 0.029 | 0.65 | 0.63 |

TABLE I-continued

| Ambient Temp °C | Tank Temp °C Top | Tank Temp °C Bottom | Average Tank Temp $T_\omega$ °C | Insolation G W/M² | Time Increment Min | $\frac{T_\omega - T_e}{G}$ | Efficiency $\eta$ | Efficiency Averaged Over Two Periods |
|---|---|---|---|---|---|---|---|---|
| 15.5 | 40.0 | 39.5 | 39.75 | 916 | 6 | 0.029 | 0.32 |  |
| 15.5 | 41.5 | 41.0 | 41.25 | 890 | 5 | 0.031 | 0.62 | 0.47 |
| 16.0 | 43.0 | 42.0 | 42.5 | 885 | 6 | 0.033 | 0.43 |  |
| 16.5 | 44.2 | 43.5 | 43.85 | 857 | 5 | 0.036 | 0.58 | 0.51 |
| 16.5 | 45.2 | 44.5 | 44.85 | 890 | 5 | 0.035 | 0.41 |  |
| 16.0 | 46.5 | 45.8 | 46.15 | 890 | 6 | 0.037 | 0.45 | 0.43 |
| 16.0 | 47.0 | 46.7 | 46.85 | 618 | 5 | 0.055 | 0.42 |  |
| 16.0 | 47.0 | 47.0 | 47.0 | 123 | 5 | 0.27 | 0.45 | 0.43 |

Figure 17:
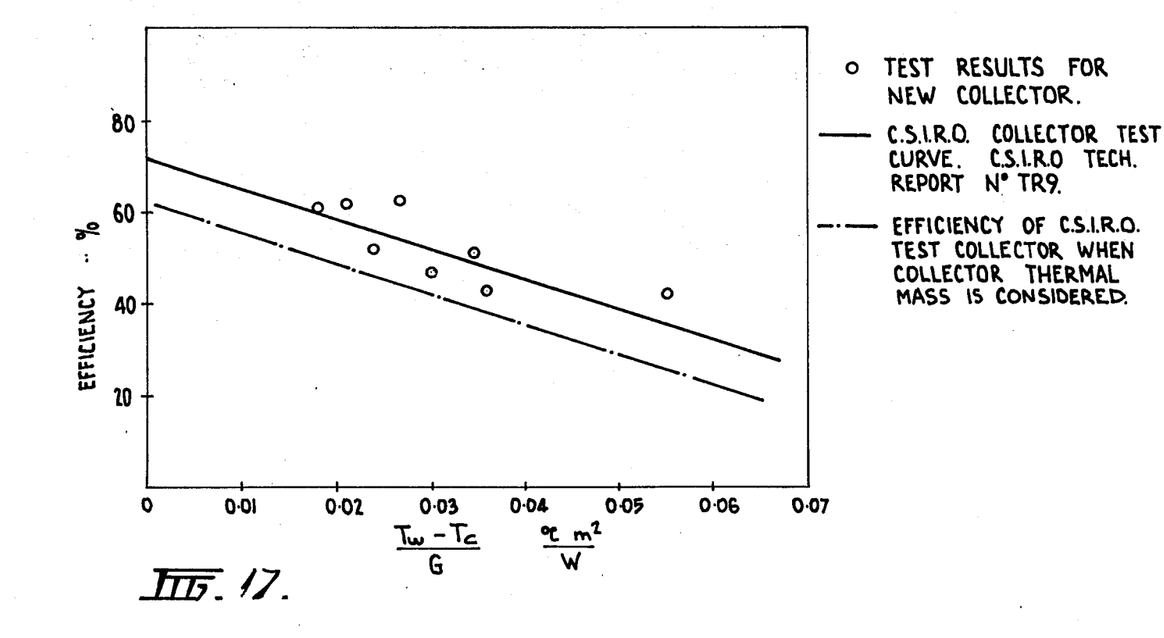
FIG. 17 is a graph showing comparative efficiencies for one preferred form of collector according to the present invention and that for a conventional collector.

From Table I it will be observed that the efficiencies were also averaged over two intervals to reduce scattering of the efficiency values when plotting the values on the graph constituting FIG. 17 of the drawings.

At this stage, as far as can be determined, there is no standard test procedure for testing solar energy collectors, and as such some difficulty was encountered in locating test results for a conventional solar energy collector in literature available, to enable a meaningful comparison to be made between the results of the testing of the collector of the present invention and a conventional collector.

However, reference has been made to a technical report No. TR9 published by the Commonwealth Scientific and Industrial Research Organization (CSIRO) in Australia.

The efficiency curve for the conventional collector shown in the CSIRO technical report has been represented as a solid line in FIGS. 17 of the accompanying drawings, which curve from the CSIRO report was produced from test data from a collector believed to have a selective coating designed to reduce heat losses and improve collector efficiency. According to the CSIRO report their test was conducted during a clear sunny day between 1100 and 1300 hours, whilst the collector was reorientated at ten minute intervals so that the surface of the collector always remained normal to incident radiation to ensure minimal reflective losses from the glass cover for the collector. The chain-dot line in the graph of FIG. 17 of the drawings represents an estimate of the actual efficiency when the thermal mass of the collector tested by CSIRO was taken into account, and it should also be noted that the method used for the test of the collector of the present invention did not take into consideration the energy used to heat the collector itself.

From the test data for the collector of the present invention when compared with that of the conventional collector of the type the subject of the CSIRO report, and with reference to the graph of FIG. 17, it will be observed that the efficiency of the collector of the present invention compares favourably with that of the conventional collector having a selective coating, and it would be reasonable to expect significant improvements in efficiency for the collector of the present invention once a selective coating is applied to the surface of the collector envelope.

Figure 18:
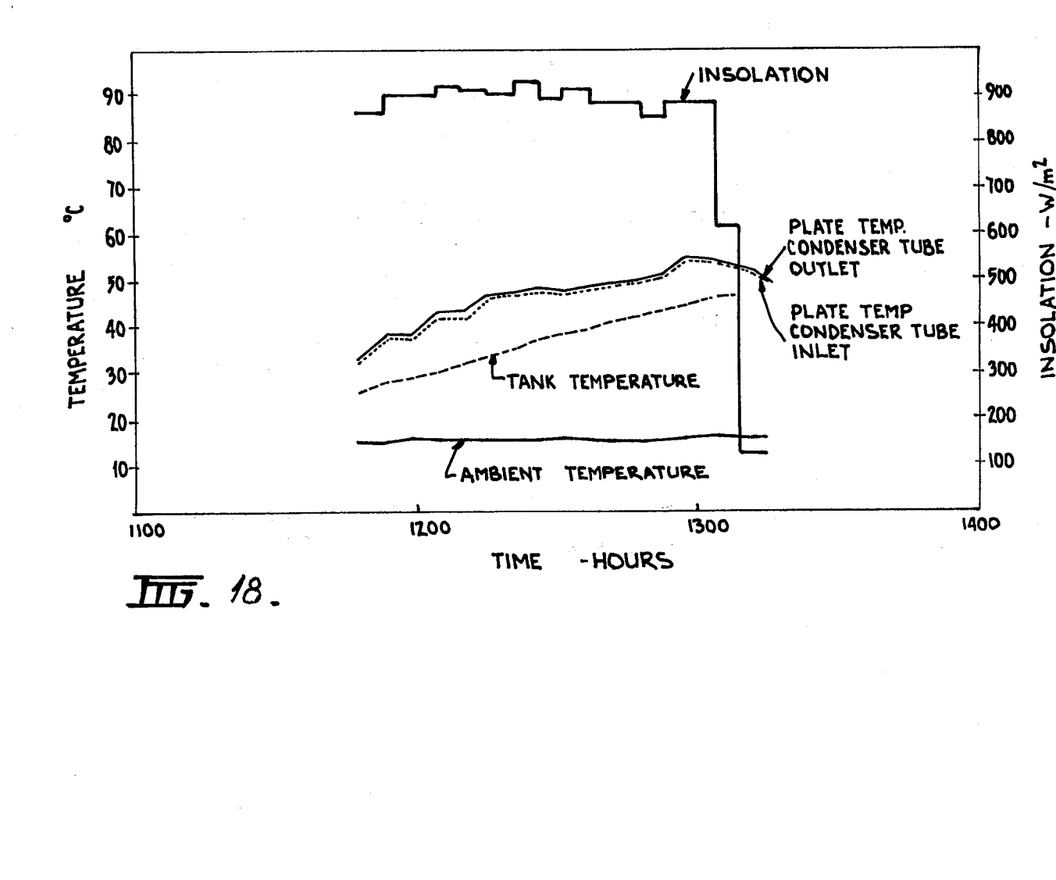
FIG. 18 is a graph showing variations in values of relevant information derived from tests carried out on a collector according to the present invention.

Referring to the graph constituting FIG. 18 of the drawings, a comparison between insolation, water storage tank temperature, and ambient and collector envelope temperatures for the collector of the present invention, has been made, from which it will be observed that the temperature differential between the collector envelope temperature and the average temperature of the water in the storage tank remains at about 8° C. for a period of relatively constant insolation.

As a rule, when the characteristics of a collector according to the present invention are compared with those of a conventional solar energy collector, it has been observed that the collector envelope may be manufactured from any suitable metal provided care is taken with the choice of the working fluid to be used in the collector, whilst with conventional collectors copper is normally only suitable. Furthermore the collector of the present invention is suitable for mass production, whilst the production of conventional collectors is highly labour intensive, whilst furthermore the collector of the present invention has a lower thermal mass than that of a conventional collector. It has also been observed that a collector according to the present invention is suitable for all climates provided that once again a suitable working fluid is used, whilst with conventional collectors most are proved to be unsuitable for climates where ambient temperatures fall below 0° C., because freezing of the water in the tubes causes fractures of joints between the various components. As a rule pressure drop through the collector envelope with the collector of the present invention is lower than that for conventional collectors, and the collector of the present invention is suitable for use with mains pressure water systems, which is not the case with conventional collectors. It has also been observed that cleaning of the condensing tube incorporated in the collector of the present invention is simple, as compared with the extreme difficulty normally encountered in cleaning the tubes within a conventional collector once they become fouled. In a situation where a plurality of collectors are combined to form a total collector system, when collectors of the present invention are utilised failure of a single collector within the system usually has a minimal effect on the operation of the system as a whole, whilst with conventional systems failure in a single collector usually effects the complete system.

With the collector of the present invention the collector usually acts as a thermal diode which permits heat transfer in one direction only, whilst when there is no vapour surrounding the condenser tube it is effectively enclosed in a vacuum and thus only very small heat losses will occur. However, conventional systems will thermo-siphon unless well designed check valves are installed within the system.

In summary, with each of the embodiments described and illustrated above, the following major advantages are believed to be present:

(a) Because the heat transfer system employed in the invention is "closed", it is possible to use working fluids other than water. In this way corrosion problems can almost be eliminated and few restrictions remain with respect to the selection of materials for the collector construction.

(b) Liquid storage temperatures approaching the temperature of the collector envelope (110° C. to 120° C.) should be possible provided that suitable working and storing fluids are used. The attainment of higher temperatures is greatly dependent on the selectivity of the surface for the collector envelope, as described by Horowitz and Watson-Monroe in "A new selective surface", in the June 1973 Proc. Sym. Int. S.E. Soc. Anz, and heat losses from the collector surface.

(c) Because of the low thermal mass of the system and the rapid heat transfer from collector to storage, more efficient use should be made of sunlight in days of intermittent cloud cover.

(d) Because of the structural strength and simplicity of the collector according to the present invention they can be readily integrated with existing building roofs or form complete roof systems.

I claim:

1. A solar energy collector comprising a close envelope formed from two sheets of metallic material sealed together around their peripheral edges and spaced apart to define a space adapted to be filled with a working fluid, said opening into a vapour space into which said working fluid can vapourise when heated by exposing one surface of the envelope, defining said working fluid space, to solar radiation, at least one condensing tube in heat exchange relationship with said vapour space and through which liquid to be heated flows, and means for returning condensed vapour from said vapour space to said working fluid space, wherein at least one of said two sheets has a plurality of parallel extending indentations formed therein, the inner extremeties of the walls defining said indentations abutting the surface of the the other sheet to space said sheets apart, wherein said indentations are alternatively of large and small cross-sectional area, said larger indentations forming a plurality of spaces primarily for working fluid and the smaller of said indentations forming a plurality of channels primarily for returning said condensate, and wherein at least one of said sheets has an outwardly directed indentation formed therein to define said vapour space, and at least one of said sheets including an outwardly directed indentation at the opposite end thereof to provide a channel for fluid communication between said condensate return channels and said working fluid spaces.

2. A solar energy collector as claimed in claim 1, wherein the, or each, condensing tube is bonded to the outer surface of the wall of the part of said envelope defining said vapour space.

3. A solar energy collector as claimed in claim 2, wherein the, or each, condensing tube is located within an outwardly directed groove formed in the part of said envelope defining said vapour space.

4. A solar energy collector as claimed in claim 1, wherein the, or each, condensing tube passes into and through said vapour space.

5. A solar energy collector as claimed in claim 1, wherein said parallel extending indentations are formed by corrugations of alternatively large and small width.

6. A solar energy collector as claimed in claim 5, wherein the corrugations are formed in the lower of said two sheets and the outwardly directed indentation to define said vapour space and the outwardly directed indentation to provide said channel for fluid communication between said condensate return channels and said working fluid spaces are formed in the upper of said two sheets.

7. A solar energy collector as claimed in claim 1, wherein said collector further comprises a container open at one face thereof and in which said closed envelope is positioned, said envelope being surrounded beneath, and at the sides and ends thereof, by a layer of insulating material, and wherein the open face of said container is closed by at least one sheet of solar radiation transparent material.

8. A solar energy collector as claimed in claim 7, wherein the transparent material is toughened glass.

9. A solar energy collector as claimed in claim 1, wherein said working fluid is water.

* * * * *